May 29, 1934.  J. L. ANDERSON  1,960,523
MANUFACTURE OF FUSION WELDED PIPE
Filed Dec. 14, 1929  3 Sheets-Sheet 1
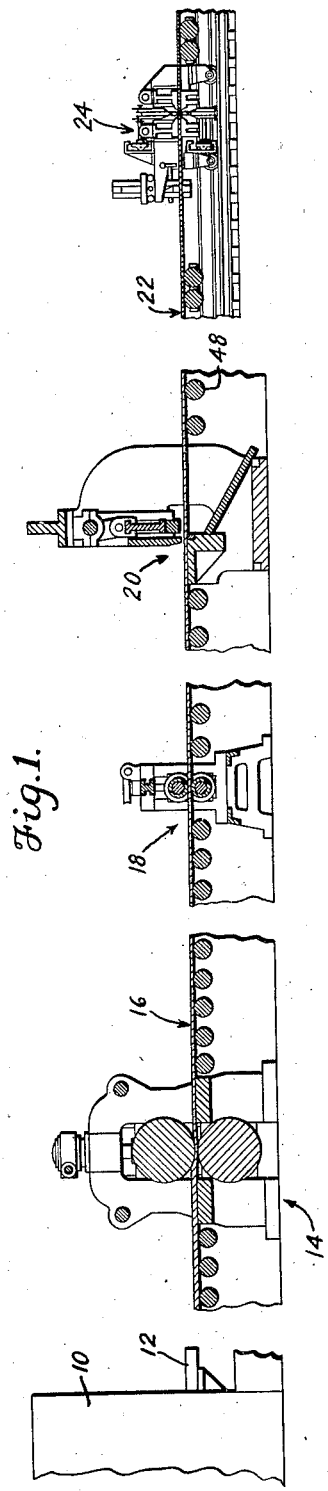
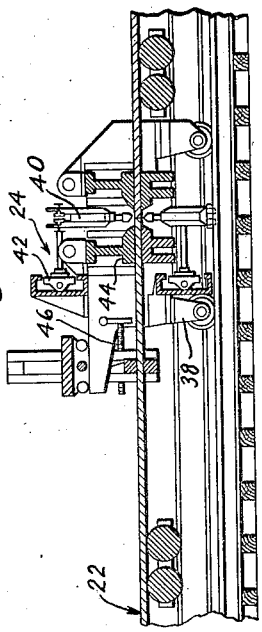
INVENTOR
James L. Anderson
BY
ATTORNEY

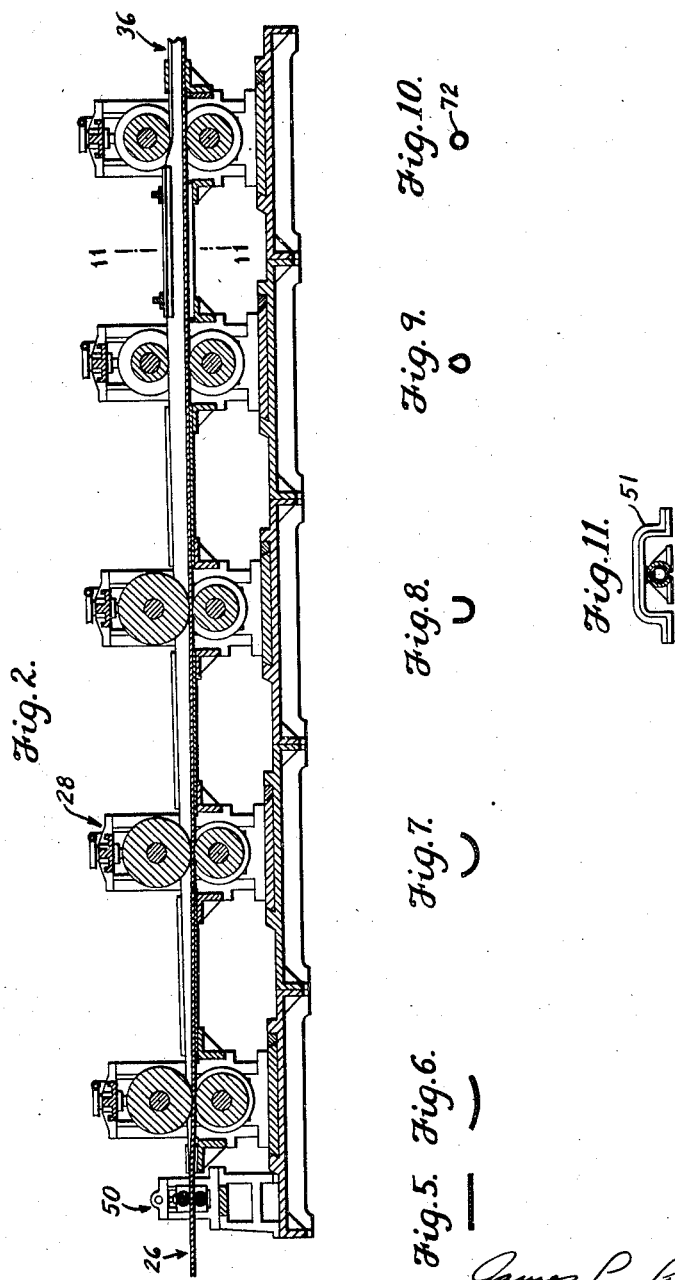

May 29, 1934.   J. L. ANDERSON   1,960,523
MANUFACTURE OF FUSION WELDED PIPE
Filed Dec. 14, 1929   3 Sheets—Sheet 3
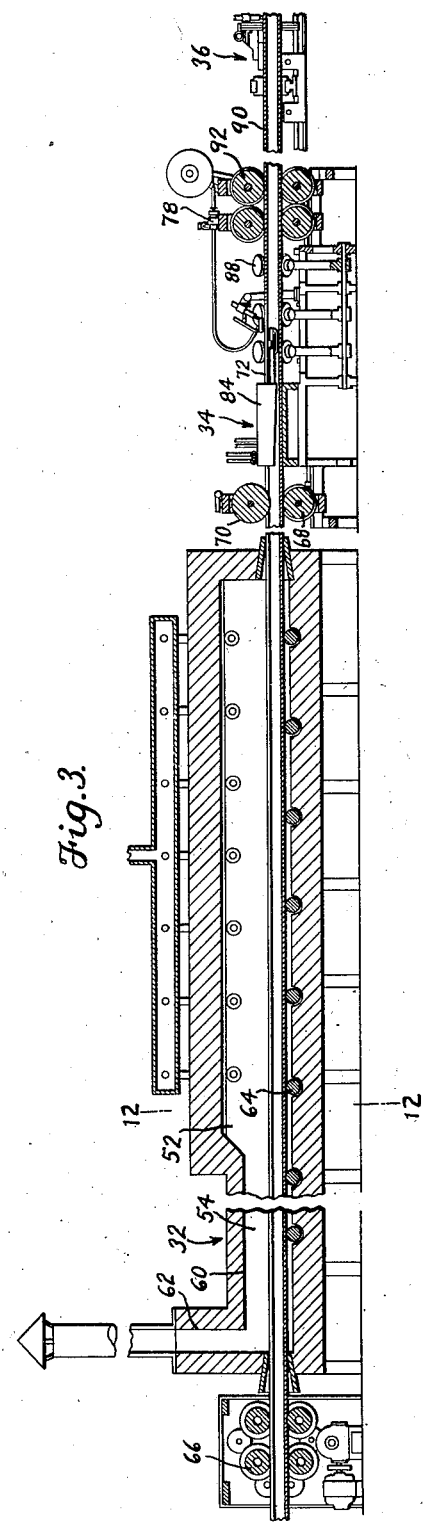
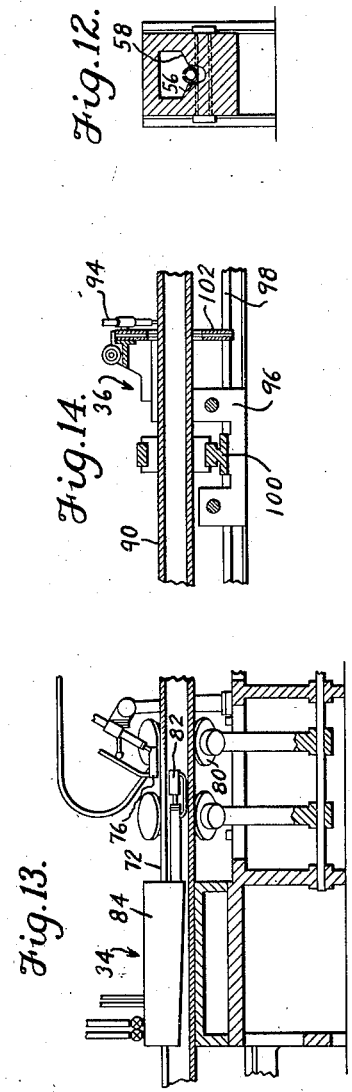

Patented May 29, 1934

1,960,523

UNITED STATES PATENT OFFICE 1,960,523

MANUFACTURE OF FUSION-WELDED PIPE

James L. Anderson, Tenafly, N. J., assignor to Air Reduction Company, Incorporated, New York, N. Y., a corporation of New York Application December 14, 1929, Serial No. 413,977

13 Claims. (Cl. 29—33)

This invention relates to the manufacture of fusion welded pipe and tubing. In accordance with this invention, a mass of ferrous metal, originally heated to a working temperature, is passed successively through mills for forming sheets, plates, or skelp and for then forming the sheets or skelp into open-seam tube. Then, after reheating, or even without reheating, and, in any event, with the benefit of the heat remaining in the metal, the seam is closed by fusion and solidification. It is intended that large billets or pieces of metal at a temperature for hot rolling will be used, and that long lengths of sheet or skelp will be formed.

It is an object of this invention to form heavy-walled pipe of substantially all diameters, including the large sizes, from steel and wrought iron, immediately after the solid metal has been worked through the stages of being formed into sheets and of being bent or curved into tubular shape. The process involves welding together the margins of the seam, produced by the tube forming operation, while heat remaining from the sheet-forming operation and present in the metal during the tube-forming operation is still retained by the metal. The welding of the pipe is effected by fusion, and preferably by the oxyacetylene, or high temperature flame process. Under this invention, pipe, including a large range of diameters and wall thicknesses, can be produced. Pipe up to 24 inches in diameter and ½ inch in wall thickness, or larger or heavier, can be made, starting from massive material. The process is applicable to the commercial manufacture of welded pipe of the larger sizes and wall thicknesses, though it may also be applied to the manufacture of smaller sizes. The general purpose is to produce rapidly, economically and perfectly, welded pipe having the homogeneity, strength and special advantages of oxyacetylene welding. Large output, little waste, and strong perfectly welded pipe that can be handled in whatsoever way may be necessary, is the objective.

The process produces at high speed a smooth, integral product, with welds of substantially the same strength as, or of greater strength than, the metal itself. The pipe produced is capable of use in high or low pressure installations, is susceptible of all operations of bending, threading, etc., and is produced in uniform diameter and of uniform wall thickness.

Formerly, in the manufacture of welded pipe, the ordinary commercial procedure has been to cast the metal into ingots, and thereafter form blooms or billets from the cast ingots. After seasoning, the billets were formed into long, narrow strips, commonly known as skelp. The skelp was subsequently formed, by drawing through dies, or by passing through rolls, into tubular shape. Then or thereafter by some welding operation the seam is closed. In various of these steps a heat loss was involved, the metal being heated before the commencement of an operation, being allowed to cool after the operation was completed, and at some later time being again reheated for the next operation. The metal was placed under great strain in forming the tube, and the welded seam thereafter placed under circumferential stress, due to the elasticity of the metal. Additionally, the welds produced were usually the result of the adhesion of two surfaces of metal, and therefore a weak connection. The operations required workmen skilled in determining the proper heat for the metal before the welding operation, which was generally the result of bringing together the heated edges of the plate under great pressure. Since radiation losses between furnace and welding machine had to be accounted for, the tube had to be heated much above the heat required for welding. Collapse of the tube, bending of the tube, or burning of the metal, or all of these were possible and likely.

The ends of each section of tubing thus produced had to be cut off as imperfect. Only short lengths could be handled, and the fixed percentage of scrap was relatively high for that reason alone without considering the often staggering losses from defective welds. Oxidation, and consequent scaling and defective adhesion at the weld, was another problem, since the heated metal was directly exposed to the air during the welding operation, without any provision made against oxidation.

Oxyacetylene welding has been used industrially for welding the longitudinal seams of light-walled tubing, but it has not been considered economical for the manufacture of pipe of the larger sizes having heavy walls, because of the low linear speed of welding and consequent high cost of the product.

In the process set forth herein, metal heated to hot rolling temperature is passed through a mill to roll it into plates or sheets. The metal may be in any usable form at the commencement of this operation, preferably such as a billet. For the purpose of this specification, "billet" will be taken to mean any solid mass of ferrous metal such as steel or wrought iron which is workable to form a long and relatively narrow sheet or plate, that is to say, a strip of substantially uniform thickness and width.

The long, relatively narrow sheets produced from rolling the heated billets may be termed skelp. For the purpose of this specification the term "skelp" will be used to denote the product of rolling the billet into long sheet or plate form, while the term "trimmed skelp" may be used to define the skelp after it has been trimmed preparatory to its further progress in the process.

After each billet has been completely rolled out into a skelp, and not before, the material is passed onward through succeeding steps of the process, including the shaping of the flat metal into tube form and the welding of the longitudinal seam. This is important, since the linear speed of welding is not governed by, but is independent of, the final speed of rolling, which is very high. Thus, the skelp rolling step is performed intermittently, whereas the forming and welding operations are continuous.

The product of rolling the billet into long plate or sheet form, that is, the skelp, may be non-uniform in width and have end edges not square to the longitudinal edges. The skelp is therefore subjected to two shearing or trimming processes, one for trimming the longitudinal edges to determine the diameter of the pipe finally to be derived from the process, and the other for cutting off the end edges for a purpose hereinafter appearing. For the first may be substituted the use of end rollers in the skelp rolling operation, such rollers limiting the width of the skelp. However, shearing by rotary slitting shears, by hot saw, or by alligator shears may be used to determine the width of skelp formed by the skelp rolling mill, while a shear or hot saw of any desired type may be utilized to cut off and square the ends of the strips.

As the long sheets thus formed and trimmed are delivered, the trimmed ends of successive sheets are brought into abutting relation and welded together; the continuous sheet or strip thus formed is passed through a tube forming mill, wherein the sheet will be bent so that the edges will be brought substantially into contact, forming open-seam tube.

The term "open-seam tube" may be taken to mean ferrous metal plate or sheet, curved to bring the longitudinal edges into proximity, before the edges are joined.

The operation of forming the tube is carried out while the skelp or trimmed skelp still retains the residual heat from the skelp-forming operation. In the tube-forming operation the skelp may, if desired, be subjected to longitudinal pull; wrinkles in the metal will thus be eliminated or substantially reduced to a minimum. Since the metal is at a temperature nearly that of the working temperature, no appreciable distorting strain need be placed upon the metal, less power will be required for the forming operation, less difficulty will be encountered in producing pipe which is straight, and since the metal is more pliable at the temperature contemplated, the edges of the tube will be brought easily into closer abutment than by working in the cold, thereby facilitating the welding operation.

From the tube-forming mill the continuous tube is passed into and through a reheating furnace. The metal of the tube still retains sufficient heat to furnish much of the heat for the subsequent fusion welding operation; however, where it is desired, as in the preferred method, to bring the metal to a considerably higher temperature preparatory to welding, the reheating furnace may be utilized. This furnace may be varied in form, but is preferably constructed as a top-fire furnace in which a combustion chamber and flue of small cross-sectional area is provided. The furnace is so constructed that the upper portion of the open-seam tube, in which the unwelded seam is located, will be subjected directly to the action of the gases in the combustion chamber. The arrangement of the combustion chamber and the manner in which the fuel is burned is such that the tube will enter the combustion chamber at the coolest end of the furnace and leave at the hottest end, so that at its exit from the furnace the tube will be ready for the action of the welding apparatus hereinafter described; also, by this gradual passage from a cooler to an intensely hot region, the tube will be subjected to less stresses tending to buckle, or distort it, because of less expansion of parts of the tube under smaller changes of temperature at the welding machine.

The temperature of reheating is not high enough to cause the metal to sag or collapse; it is preferably sufficiently high that in the welding operation described hereinafter only a moderate amount of heat other than the latent heat of fusion of the metal operated upon need be added to fuse the seam closed. For example, the seam region of the open-seam tube can be brought to a temperature in the neighborhood of 1600° F., or above, depending upon the size and material of the pipe, after which the seam is brought under the action of a group or groups of oxyacetylene heating and welding flames. In this welding operation, the edges or borders of the seam are united by fusion and commingling of the metal in the fluid state, so that by solidification of this metal there results a homogeneous weld which blends without demarcation into the wall of the pipe, of which it is an integral part.

In the typical case, the borders or edges of the seam are melted and caused to flow together or they may be interfused with molten metal added from a weld metal wire. Compression of the weld, for the purpose of reinforcement or for the refinement of the metal of the welded seam, may alternatively or conjunctively be used in this connection. Where the size of the pipe to be formed permits, torches may be mounted in position, by a suitable cantilever arm, to apply a fusing heat within the tube and against the internal edges of the seam. When very great speed in carrying out the welding operation is desired, heat from an autogenous welding torch or torches may be applied to fuse a film of molten metal on the edge faces; thereupon the edges may be brought or pressed into contact so that the molten metal on the edges may commingle and congeal. The process may be carried out by fusing the edges while held in spaced relation, then bringing them forcibly into contact, squeezing out the excess molten metal, if any, in the form of a flash and thereafter applying heat to fuse this flash into the body of the weld on the inner and/or outer surfaces.

Since the reheating operation added to the original working heat of the metal will have raised the seam edge regions to a very high temperature, the application of heat by means of the welding torch will quickly raise the metal to the fusing point. Ideal penetration of the fusing heat will thus be accomplished, while it will be required that the tube be fed through the welding machine at considerable speed.

After the welding operation, the pipe still retains heat from the preceding steps. It is desirable to utilize this heat in the step of cutting the continuous pipe into sections. For this purpose, an oxygen cutting torch lends itself most efficiently, the hot seam requiring but little additional heat to permit an oxygen jet to puncture the metal and initiate cutting. To facilitate the cutting operation, the torch may be mounted for movement around the pipe and with the pipe, as it travels away from the welding machine.

In this operation of making pipe, since the open-seam tube when brought to the welding flames is already fairly close to a fusion welding temperature, maximum speed of welding is possible, and the operation from metal mass to fusion-welded pipe is rapid and very economical. Likewise, due to the heat content of the tube prior to the action of the welding torch or torches, no great expansive stress is encountered when handling the tube, and therefore buckling of the tube or deformed seams under the action of the rolls of the welding machine is eliminated. Since the metal is brought to the welding machine at an elevated temperature, the metal of the tube will have temporarily lost its elastic properties, or its elasticity will have been greatly reduced, and the weld will be subjected, either during the welding operation or thereafter, to little or no circumferential stress tending to tear the newly welded seam apart.

Other objects and features of this invention will appear from the description of a specific embodiment of the invention hereinafter set forth and shown in the drawings forming a part of this specification.

In the drawings, in which a diagrammatic showing of the method of carrying out the invention is illustrated;

Figs. 1, 2 and 3, when placed end to end, in the order named, comprise an elevational view of a plant embodying the invention, parts being shown in section to illustrate the construction thereof;

Fig. 4 is an enlarged elevational view of the cross-seam welding machine appearing in Fig. 1;

Figs. 5, 6, 7, 8, 9 and 10 are sectional views of the sheet metal, showing its deformation after passage through the respective rolls of Fig. 2 under which each section is positioned;

Fig. 11 is a detail transverse sectional view on the line 11—11 of Fig. 2, illustrating the method of guiding the deformed metal to the final forming and sizing rolls;

Fig. 12 is a transverse sectional view on the line 12—12 of Fig. 3, illustrating the construction of the reheating furnace;

Fig. 13 is an enlarged elevational view of a portion of the welding machine shown in Fig. 3; and Fig. 14 is an enlarged elevational view of the cutting-off machine shown in Fig. 3.

In the embodiment shown in the drawings there is disclosed a furnace 10, in which billets 12 or like masses of metal to be worked by the hot rolling mill 14 are heated to about 2200° F., though this figure is not intended to be limiting. Rolling mill 14 may be of any desired type, receiving the mass of metal, such as billet 12, and reducing its cross-section to that of a long, comparatively narrow sheet or strip 16, which may be termed skelp. The term "sheet" is used for convenience. The flat, rolled metal from which pipe of heavy wall thicknesses may be made, for the economical manufacture of which the process is well adapted, may be classified as plate. "Sheet" is therefore to be understood as including plate.

The skelp 16 is passed from mill 14 to shears 18 and 20, after which the sheets 22, thus formed, are brought to a suitable cross-seam welding apparatus 24, at which point said sheets are united end to end into a continuous sheet 26. Continuous sheet 26 is now fed through a forming or tube-rolling mill 28, in which the sheet is converted into an open-seam tube 30. Where skelp is produced in sufficiently great length, this step of welding the sheets together may be omitted; however, to eliminate the operations of resetting the apparatus after a strip of skelp has been finished, the cross-seam welding step is utilized, even where long strips are available.

Open-seam tube 30 is continuously fed through the reheating furnace 32, from which it is fed through the welding machine 34, where the seam is welded by fusion. The traveling continuous pipe may then be cut into predetermined lengths by suitable means, such as the circumferential cutting apparatus 36.

Rolling mill 14 produces a skelp strip 16 of approximate, or it may be, exact width for the manufacture of pipe having a predetermined diameter. Preferably furnace 10 and mill 14 will be built to accommodate and work large and relatively long masses of metal in order that the skelp produced thereby may have considerable length. For this purpose, a mill capable of handling sheets up to 150 feet or more in length is more especially intended, that is, a mill the delivery table of which is in the neighborhood of 300 feet or more in length. A single stand mill has been illustrated, but it is to be understood that the mill may consist of a plurality of roll stands, each of which will effect a predetermined reduction. The number of passes required in such case will be determined by the characteristics of the metal and the reduction in cross-section desired. End rolls may be associated with mill 14 to limit the width of the formed sheet and thus predetermine the diameter of the finished pipe. At its exit from rolling mill 14, the skelp will have cooled to about 1500° F., more or less.

Shears 18 and 20 are provided for two purposes, viz., for cutting the sheets to a desired width and for trimming the ends of the sheets. The former operation may be substituted by the use of end rolls in connection with rolling mill 14 as described above. Where such rolls are not used, shears 18, used for trimming the edges of skelp 16, may be of any desired type, as rotary slitting shears, hot saw or alligator shears. The edge-trimming apparatus may be arranged to provide a beveled edge in cases where the metal is very thick, as this facilitates penetration of the weld. Squaring shears 20 for trimming the transverse edges may be of the hot saw or alligator type. Shears 20 cut off the skelp 16 at the ends to provide edges substantially perpendicular to the direction the skelp travels. Rollers, which may be power-driven, where heavy sheet or plate is being handled, are preferably arranged on the table of mill 14, between the mill and shears 18, between shears 18 and 20, and on the discharge side of shears 20 up to the cross-seam welding device 24.

At welding device 24, the abutting ends of consecutive sheets are brought into close contact, are clamped and jigged, and the seams thus formed are closed by welding. At this point in the process, the metal will have lost more heat, so that its temperature may be in the neighborhood of 1200° F., and it is now ready for working in mill 28. Between the end of rolling mill 14, and the tube-forming mill 28, a considerable distance is allowed for the handling of the skelp in the shearing and cross-welding operations and for coordinating the substantially intermittent feed of mill 14, the intermittent operation of welding apparatus 24, and the continuous operation of tube mill 28. The cross-seam welder 24 will preferably be arranged upon a sliding support 38 to move longitudinally with sheets 22, while the torches 40 are supported upon carriages 42 movable transversely of the moving sheet. By mechanically operated clamps 44, the ends of the sheets are clamped in abutment after the adjusting mechanism 46 has so positioned them. The torches 40 are then fed transversely across the seam to weld the sheets together. The welding of the cross-seams might be done with a hand torch.

The distance from the shears to the tube-forming mill is about 200 feet, this, like other figures herein, to be taken illustratively. A driven roller conveyor 48 may be arranged to deliver the continuous sheet 26 to the tube-forming mill 28, where by a series of rolls the hot sheet is curved in a known manner into a tube 30, with the longitudinal ends of the sheet brought substantially into abutment, though they may be separated, or the metal may be put into the form of a wide open tube blank, or even into U-shape, to be finally shaped later on.

The particular construction of said forming mill forms no specific part of this invention except in so far as it relates to the method of producing more or less tubularly shaped metal, continuously, from hot metal, and, in preferred cases, under a drawing or stretching action. The apparatus may have a power-driven feeder 50 for threading the sheet 26 between the first set of forming rolls. The subsequent steps of forming the pipe may, in a preferred case, proceed as indicated in the consecutive Figs. 5 to 10 inclusive, positioned below the respective roll stands of Fig. 2, which cause the indicated deformation. Each roll stand is preferably provided with water-cooled bearings, receives the sheet 26 continuously as formed, and continuously shapes such sheet into tubing. Suitable guiding sleeves may be provided between consecutive roll stands. Between the last two stands, a finned sleeve 51 may guide the tube to the rolls which are provided for the final step of shaping and sizing the metal before passing to the welding machine. The location and angularity of sleeve 51 will be properly determined to cooperate with an aligned fin on the welding machine 34.

At the discharge end of tube-forming mill 28, the temperature of the metal will have dropped to about 1000° F. The temperature at this stage may be somewhat lower or higher, but in any event it represents a highly important residual heat content, which is of great value for the subsequent longitudinal seam welding operation, and which reduces the amount of heat to be put in by the reheating furnace 32. In fact, the tube 30 may be passed directly to the welding machine 34, wherein the retained heat from the forming operation will effect a material saving in the gases necessarily consumed in raising the seam edges to welding temperature as well as appreciably increasing the speed of welding, for a definite consumption of gases, over that accomplished with metal in comparatively cold condition.

Preferably, however, in order to effect economy by reducing the quantity of gases used for attaining the final high temperature of fusion required for welding and to effect a great increase in the linear welding speed, the continuous tube 30 is now passed through furnace 32 heated by any ordinary, relatively cheap fuel. The length of this furnace is such that, at the maximum rate of feeding of tube 30 and with suitable firing of the furnace, said tube will emerge from said furnace with its temperature materially raised and preferably in the neighborhood of 1600°-1800° F., or not far below the fusion point of the metal.

This reheating step not only insures very high linear speeds of welding, large output, and great saving in welding gases, but also makes the forming and welding of pipe and tube in continuous operation more economic, since the welding speed is raised to a rate of travel not so much below the speed at which costly tube-forming apparatus is capable of operating that advantage would be sacrificed.

Furnace 32, in a preferred construction, is provided with an overhead combustion chamber 52 and a long flue 54, the latter being of small cross-sectional area. Flue 54 is formed preferably with a depression 56 in the floor 58. Floor 58 is spaced closely adjacent roof 60 of said furnace, so that the burning gases from chamber 52 will pass through the narrow space between floor 58 and roof 60 and be brought into substantial contact with that small portion of tube 30 exposed to the direct action of the furnace gases and not protected by the walls of flue 54. In this manner, although the entire tube is subjected to the furnace heat, only the seam region of the tube will be directly acted upon by the burning gases themselves. Furthermore, chamber 52 is located at that end of furnace 32 from which tube 30 is to be discharged to the welding machine 34. The gases from chamber 52 will move through flue 54, contrary to the direction of movement of tube 30, and out through a stack or chimney 62, closely adjacent the entrance end of said tube. Therefore, tube 30 will pass through a region of increasing temperature, being subjected to the highest temperature of said furnace substantially at the point at which said tube is discharged from said furnace.

For the efficient and easily controlled operation of furnace 32, it is desirable to use either fuel oil or coke-oven or other low cost gas. The amount of air admitted to support combustion may be controlled in such manner that incomplete combustion take place. The gases carrying such unoxidized products will have reducing properties, and will tend to eliminate possible oxidation of the metal of tube 30 during its passage through the furnace. Substantially complete protection against such oxidation may be obtained by constructing furnace 32 as a muffle furnace, and by depending, for guarding tube 30 against oxidizing elements, upon the substantial quiet of the gases in the portion of furnace 32 through which tube 30 passes. However, some inert, or substantially inactive gas may be passed into such portion of the furnace for entirely eliminating the possibility of oxidation of the metal.

Within the portion of furnace 32 through which tube 30 passes, such as the depression 56, suitable rollers 64 may be positioned to facilitate the passage of the tube. Water cooling of said rollers and the bearings thereof will be resorted to in order to protect these parts against burning. Where the strain upon the driven rolls of welding machine 34 and the tube-forming mill 28 would be too great to accomplish feeding of tube 30 through furnace 32, rolls 66 driven in synchronism with the other driven rolls may be positioned either at the entrance to or at the exit from furnace 32, or at both, to move tube 30 through said furnace.

Immediately on discharge from reheating furnace 32, tube 30 passes to the first set of rolls 68 of the welding machine 34, the construction of which may be similar to that shown in my Patent 1,520,271, dated December 23, 1924. The upper one of these rolls may be provided with a fin 70, to guide the seam region 72 of the tube 30 under the flame jets issuing from one or more torches 76 of machine 34. The torch tip or tips are designed to deliver a multitude of closely spaced high-temperature flame jets, or possibly ribbon jets, the group or groups of jets extending several or many inches lengthwise of the seam and preferably also spread transversely so as to produce an area rather than a line of intense heating. A wire feeding device 78 may be arranged in conjunction with one of, or each of, the torches 76 to add metal to the fused joint. In the former case one layer only of metal will be added. However, where a sufficient groove has been provided between the approximate or abutting edges of the seam 72, a series of wire feeds may be arranged to successively lay down into said groove a quantity of such molten metal.

The method of heating may be that disclosed in my Patents Nos. 1,402,996, 1,402,997 and 1,516,486, in which part or all of the flames are directed at points spaced away from the edges of tube 30; or the edges themselves may be subjected to the direct heat from torch 76. In the first case, the margins of the seams will be melted and caused to unite where the edges are brought or pressed together under the influence of the so-called welding rolls 80. Said rolls may operate merely to bring the edge regions together, without actually applying pressure to the weld. However, where a full or reinforced welded seam is desired, rolls 80 may be set closer for the purpose of applying pressure to squeeze up the molten or plastic metal. Pressure between the rolls may also be utilized to improve the structure of the metal of the joint.

In the other case the edges only are heated while they are in spaced relation. By this method a layer or film of fused metal is formed which clings to the unfused metal. The tube 30 then passes to the rolls 80, which quickly bring or press together the edges carrying the molten film, causing such metal to unite in a homogeneous joint. If sufficient pressure is applied, a flash may be formed, which may be fused down by the last jet or jets.

Where the diameter of pipe to be operated upon permits, a welding torch 82 may be suspended within tube 30 as by a cantilever arm 84, extending down through the open seam 72. Where such an arm is utilized, the use of the fin 70 on roll 68 may be dispensed with. The flames from torch 82 will be directed upwardly against the inner edges or borders of seam 72 and thus assist the torches 76 in securing the desired penetration of the weld. It will be understood that even without torch 82, complete penetration is obtainable with the torch or torches 76 outside the tube. Torch 82 assures greater speed and more efficient operation when used in conjunction with torch 76, this combination being especially advantageous for large and heavy pipe. More than one torch may be used on the inside of the pipe in this manner.

As is well known, the products of the combustion of the oxyacetylene welding flame are hydrogen and carbon monoxide, both active reducing agents. These gases form the envelope, which burns away from the point at which the weld is being made. A large proportion of these gases will be forced into tube 30 through seam 72, therein to flow toward furnace 32 and toward the other end of tube 30, thereby protecting the interior of the tube against oxidation.

Since the welding operation produces a long puddle of molten metal, and since the tube travels rapidly, auxiliary rolls 88 may be required to hold the weld until it sets sufficiently. These rolls may also have the function of working the metal of the weld.

After the auxiliary rolls 88, the closed seam pipe 90 is acted upon by the sizing rolls 92, which reduce the tube to the finally desired size and shape, and which may also serve to work the metal of the weld.

Where a substantial reinforcement is raised by welding rolls 80, it may be desired to shape the welded joint to that of the pipe by mechanical means. A rotating cutter or grinder of any desired construction may be arranged to remove this excess metal as pipe 90 passes continuously from machine 34.

The traveling continuous pipe is then cut into desired lengths by a suitable or known instrumentality, which is preferably the circumferential cutting apparatus 36 having a torch 94, mounted upon a support 96 movable along a track 98. A pneumatic chuck 100 provides means for clampingly engaging the pipe in order that the torch support may move with said pipe. Torch 94 may be mounted on a rotatable disk 102 through which pipe 90 is permitted longitudinal movement. By rotating disk 102 while the chuck 100 is in engagement with the pipe, the torch may be fed around the pipe to cut off a predetermined length, the support 96 moving along with the pipe.

By this method of operation, great economy and high speeds in the manufacture of fusion welded pipe are realized. The conservation of heat, the ease of working the hot metal into tubular shape, the speed of reheating, the elimination or reduction of distorting stresses, the great economy of gases used in the oxyacetylene torches, and the high rate of production of perfect fusion-welded pipe, are direct results of the method. Scrap losses are reduced to a minimum, the trimming of the skelp ends involving the only loss. Since the metal is worked hot, belled-out ends are avoided even if end to end welding is not resorted to.

It is to be understood that the operation of mill 14, shears 18 and 20, mill 28, and welding machine 34 will be synchronized so that the least cooling of the metal will take place between successive steps, and also to make the process a continuous one.

While the complete process substantially as herein described is preferably employed, I wish also to claim the various novel steps and sub-combinations of steps which may be utilized to advantage in the manufacture of welded pipe, whether starting from the billet or not.

I claim:

1. A process for the manufacture of pipe and tubing from hot billets, in which the billet is rolled to flat skelp, the hot skelp is formed into open-seam tube, and the tube is welded while it retains heat from these operations, the seam edges being brought to fusion for the welding step by means of high-temperature flame jets, and in which the step of rolling the billet into skelp is completed before the material is passed to the welding step.

2. A process for the manufacture of pipe and tubing from hot billets, in which the billet is rolled to flat skelp, the hot skelp is formed into open-seam tube, and the tube is welded while it retains heat from these operations, the seam edges being brought to fusion for the welding step by means of high-temperature flame jets, and in which the step of rolling the billet into skelp is completed before the material is passed to the forming and welding steps, which steps are performed simultaneously upon different portions of the same material.

3. A process for the manufacture of pipe and tubing from hot billets, in which the billet is rolled to flat skelp, the hot skelp is formed into open-seam tube, the open-seam tube is immediately passed through a long reheating zone, and the seam is then welded with high-temperature flame jets beyond the reheating zone, by which jets the edges are brought to fusion, and in which the step of rolling the billet into skelp is completed before the material is passed to the forming, reheating and welding steps, which steps are performed simultaneously upon different portions of the same length of material.

4. A process for the manufacture of pipe and tubing from hot billets, which comprises rolling each hot billet to form a flat skelp, trimming each flat skelp to definite width, forming the hot and trimmed skelp into open-seam tube, and welding the longitudinal seam by means of high temperature flame jets while the tube retains heat from the skelp-rolling operation, and in which process the step of rolling the billet into skelp is completed before the material is passed to the tube forming and welding steps.

5. A process for the manufacture of pipe and tubing from hot billets, which comprises rolling each hot billet to form a flat skelp, trimming each flat skelp to definite width and shearing the ends, and welding the front end of each skelp to the rear end of the material passing through succeeding steps of the process so that continuous material is provided indefinitely for these steps, which include forming the hot skelp material into open-seam tube, and welding the seam of the tube while the material still retains heat from the rolling step, the welding being performed with high-temperature flame jets which bring the edges to fusion.

6. A process for the manufacture of pipe and tubing from hot billets, which comprises rolling each hot billet to form a flat skelp, and welding the front end of each skelp to the rear end of the material passing through succeeding steps of the process so that continuous material is provided indefinitely for these steps, which include forming the hot skelp material into open-seam tube, and welding the seam of the tube while the material still retains heat from the rolling step, the welding being performed with high-temperature flame jets which bring the edges to fusion.

7. A process for the manufacture of pipe and tubing from hot billets, which comprises rolling each hot billet to form a flat skelp, trimming each flap skelp to definite width and shearing the ends, and welding the front end of each skelp to the rear end of the material passing through succeeding steps of the process so that continuous material is provided indefinitely for these steps, which include forming the hot skelp material into open-seam tube, reheating the open-seam tubing in passage through a long reheating zone, and then welding the seam, the welding being performed with high-temperature flame jets beyond the reheating zone, by which jets the edges of the seam are brought to fusion.

8. A process for the manufacture of pipe and tubing from hot billets, which comprises rolling each hot billet to form a flat skelp, and welding the front end of each skelp to the rear end of the material passing through succeeding steps of the process so that continuous material is provided indefinitely for these steps, which include forming the hot skelp material into open-seam tube, reheating the open-seam tubing in passage through a long reheating zone, and then welding the seam, the welding being performed with high-temperature flame jets beyond the reheating zone, by which jets the edges of the seam are brought to fusion.

9. In the manufacture of welded pipe and tubing, the steps of heating, in passage through a long furnace, material which has been formed curvilinearly, and in the furnace subjecting the seam region of the formed material to strong heating while limiting the heating of other portions of the shape, and then welding the seam of the hot tube with high-temperature heating and fusing flames.

10. The combination of a hot rolling mill for rolling billets or the like into flat skelp, a delivery table to receive the skelp, means for trimming the edges and shearing the ends of the skelp, means for uniting the forward end of each skelp strip to the rear end of the continuous material passing through subsequent operations, a forming mill arranged to receive the flat material and form it into open-seam tubing, a long reheating furnace through which the open-seam tube then passes, and a welding machine in front of the exit end of said reheating furnace, said welding machine being one that has means for heating the seam edges to fusion by high-temperature flame jets.

11. Apparatus for the manufacture of pipe and tubing, comprising the combination of a forming mill for shaping flat material to approximately tubular form, a welding machine in line with and distant from said forming mill, said welding machine having means for heating the seam edges of the tube to fushion by high-temperature flame jets, and a long furnace through which the material passes from the forming mill to the welding machine.

12. Apparatus for the manufacture of pipe and tubing, comprising the combination of cross-seam welding apparatus for welding the forward ends of successive lengths of skelp to the trailing end of a continuous member resulting from such additions, a forming mill by which this member is continuously formed into approximately tubular shape, a long furnace to and through which the thus-formed material passes, and a welding machine in front of the exit end of said furnace, said welding machine having means for heating the seam edges to fusion by high-temperature flame jets.

13. The combination with means for welding the seam of pipe or tube with high-temperature heating and fusing flames, of a long furnace through which the open-seam tube is passed to said welding means, the furnace chamber having a trough or guard in which the lower part of the formed but unwelded tube is shielded so that it is heated less than the seam portion.

JAMES L. ANDERSON.